US009891955B2

(12) United States Patent
Laroche et al.

(10) Patent No.: US 9,891,955 B2
(45) Date of Patent: Feb. 13, 2018

(54) HETEROGENOUS MULTICORE PROCESSOR CONFIGURATION FRAMEWORK

(71) Applicant: NXP Canada Inc., Toronto (CA)

(72) Inventors: Daniel Claude Laroche, Gatineau (CA); Craig Robert Moulder, Gatineau (CA); Xiaoyin Xu, Gatineau (CA); Ali Osman Ors, Gatineau (CA)

(73) Assignee: NXP USA, Inc., Austin, TX (US)

( * ) Notice: Subject to any disclaimer, the term of this patent is extended or adjusted under 35 U.S.C. 154(b) by 112 days.

(21) Appl. No.: 14/978,796

(22) Filed: Dec. 22, 2015

(65) Prior Publication Data

US 2017/0177410 A1 Jun. 22, 2017

(51) Int. Cl.

*G06F 9/46* (2006.01)
*G06F 9/50* (2006.01)
*G06F 17/30* (2006.01)

(52) U.S. Cl.

CPC ...... *G06F 9/5016* (2013.01); *G06F 17/30958* (2013.01)

(58) Field of Classification Search

None

See application file for complete search history.

(56) References Cited

U.S. PATENT DOCUMENTS

2007/0294663 A1* 12/2007 McGuire .................. G06F 8/45 717/108
2007/0294666 A1* 12/2007 Papakipos ................ G06F 8/20 717/119
2008/0183659 A1* 7/2008 Kuttan ................ G06F 11/2247
2009/0187915 A1* 7/2009 Chew .................... G06F 9/5033 718/104
2010/0060643 A1* 3/2010 Kolipaka ............. G06T 11/206 345/440
2010/0318780 A1* 12/2010 Arditti .................. G06F 9/5055 713/2
2011/0099553 A1* 4/2011 Agarwal .............. G06F 9/4881 718/105
2016/0267622 A1* 9/2016 Brothers .................. G06T 1/20
2016/0313999 A1* 10/2016 Meixner .................. G06T 1/20

* cited by examiner

*Primary Examiner* — Dong Kim

(57) ABSTRACT

A system and method of mapping of a processing task to a target processor is provided. Kernels associated with unit of processing defined for a processor to operate on a processing operation on the target processor required to performing the processing task. A directed acyclic graph (DAG) comprising the kernels and specifying connections between the one or more kernels represents the desired processing task to be executed by the target processor is resolved from the kernels defined in the DAG to a process executed by a processor architecture of the target processor. Data sequencing is determined from the DAG for memory usage in executing the process. Host code is generated to configure and execute the process in relation to the kernel execution for the process resolved for the processing task.

19 Claims, 20 Drawing Sheets

600 add_implementation.h

```
#include <stdint.h>

void ADD (vec08u* lpvIn0, int16_t lStrideIn0,
          vec08u* lpvIn1, int16_t lStrideIn1,
          vec16u* lpvOut0, int16_t lStrideOut0,
          int16_t lChunkWidth, int16_t lChunkHeight);
```

add_implementation.cpp

```
void ADD (vec08u* lpvIn0, int16_t lStrideIn0,
          vec08u* lpvIn1, int16_t lStrideIn1,
          vec16u* lpvOut0, int16_t lStrideOut0,
          int16_t lChunkWidth, int16_t lChunkHeight)
{
   for (int16_t y=0; y<lChunkHeight; y++)
   {
      for (int16_t x=0; x<lChunkWidth; x++)
      {
         lpvOut0[y*lStrideOut0+x] = (vec16u)lpvIn0[y*lStrideIn0+x] +
                                    (vec16u)lpvIn1[y*lStrideIn1+x];
      }
   }
}
```

700 add_wrapped.cpp

702

```
static  KERNEL_INFO _kernel_info_add
{
   "ADD",      710
   3,
   __port(__index(0),     720
          __identifier("INPUT_0"),
          __attributes(ACF_ATTR_VEC_IN),
          __spatial_dep(0,0,0,0),
          __e0_data_type(d08u),
          __e0_size(1, 1),
          __ek_size(1, 1)),     722
   __port(__index(1),
          __identifier("INPUT_1"),
          __attributes(ACF_ATTR_VEC_IN),
          __spatial_dep(0,0,0,0),
          __e0_data_type(d08u),
          __e0_size(1, 1),
          __ek_size(1, 1)),     724
   __port(__index(2),
          __identifier("OUTPUT_0"),
          __attributes(ACF_ATTR_VEC_OUT),
          __spatial_dep(0,0,0,0),
          __e0_data_type(d16u),
          __e0_size(1, 1),
          __ek_size(1, 1))
};
```

704

```
void ADD (kernel_io_desc lIn0, kernel_io_desc lIn1, kernel_io_desc lOut0)
{
   vec08u* lpvIn0  = (vec08u*)lIn0.pMem;
   vec08u* lpvIn1  = (vec08u*)lIn1.pMem;
   vec16u* lpvOut0 = (vec16u*)lOut0.pMem;

   ADD(lpvIn0, lIn0.chunkSpan,
       lpvIn1, lIn1.chunkSpan,
       lpvOut0, lOut0.chunkSpan/2,
       lIn0.chunkWidth, lIn0.chunkHeight);
}
```

*Fig. 7*

900 filter_wrapped.cpp

```
static  KERNEL_INFO _kernel_info_filter
(
   "FILTER",
   3,
   __port(__index(0),
          __identifier("INPUT_0"),
          __attributes(ACF_ATTR_VEC_IN),
          __spatial_dep(1,1,1,1),          910
          __e0_data_type(d08u),
          __e0_size(1, 1),
          __ek_size(1, 1)),
   __port(__index(1),
          __identifier("INPUT_COEF"),
          __attributes(ACF_ATTR_SCL_IN_STATIC_FIXED),
          __spatial_dep(0,0,0,0),
          __e0_data_type(d08u),
          __e0_size(1, 1),
          __ek_size(9, 1)),                912
   __port(__index(2),
          __identifier("OUTPUT_0"),
          __attributes(ACF_ATTR_VEC_OUT),
          __spatial_dep(0,0,0,0),
          __e0_data_type(d08u),
          __e0_size(1, 1),
          __ek_size(1, 1))
);

void FILTER (kernel_io_desc lIn0, kernel_io_desc lInCoef, kernel_io_desc lOut0)
{
      const vec08u*  lpvIn0    = (const vec08u*) lIn0.pMem;
920   const uint8_t* lpInCoef  = (const uint8_t*) lInCoef.pMem;
      vec08u*        lpvOut0   = (vec08u*) lOut0.pMem;

   FILTER(lpvIn0, lIn0.chunkSpan,
          lpInCoef,
          lpvOut0, lOut0.chunkSpan,
          lIn0.chunkWidth, lIn0.chunkHeight);
}
```

HETEROGENOUS MULTICORE PROCESSOR CONFIGURATION FRAMEWORK

TECHNICAL FIELD

The present disclosure relates to processor programming and in particular to configuring heterogeneous multicore processing architectures for processing data.

BACKGROUND

The configuration of heterogeneous multicore processors such as vector or array processors can be difficult in effectively using memory on the processor and minimize memory utilization outside of the processor. Parallel processing in vector or array processors can be challenging to the mapping of memory and processing functions. Standard programming techniques result in inefficient memory usage, bandwidth usage and slow performance by not optimizing interaction between multiple operations.

Accordingly, systems and methods that enable improved heterogeneous multicore processor programming remains highly desirable.

BRIEF DESCRIPTION OF THE DRAWINGS

Further features and advantages of the present disclosure will become apparent from the following detailed description, taken in combination with the appended drawings, in which:

FIG. 6 shows an example of an ADD kernel implementation;

FIG. 7 shows an example of an ADD kernel metadata and wrapper;

FIG. 9 shows a FILTER metadata and wrapper;

It will be noted that throughout the appended drawings, like features are identified by like reference numerals.

DETAILED DESCRIPTION

Figure 2:
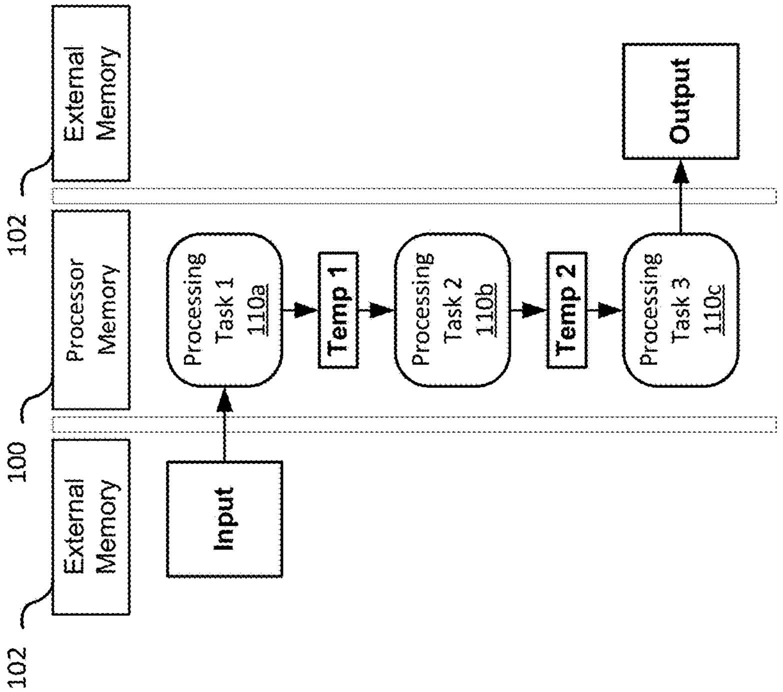
FIG. 2 shows a representation of minimizing data movement between a processor and external memory.

Embodiments are described below, by way of example only, with reference to FIGS. 1-25. At the highest level, an abstraction layer is provided which is mapped to the processor hardware (HVV), abstracting data movements and execution beneath a high level interface.

In accordance with an aspect of the present disclosure there is provided a method of mapping of a processing task to one or more target processors, the method comprising: retrieving a plurality of kernels for execution on at least one of the one or more target processors, wherein a kernel is a unit of processing defined for the processor to operate on a processing operation on the at least one of the one or more target processors required to performing the processing task; retrieving a directed acyclic graph (DAG) comprising one or more of the plurality of kernels and specifying connections between the one or more of the plurality of kernels, the DAG representing the processing task to be executed by the at least one of the one or more target processors; resolving the one or more of the plurality of kernels defined in the DAG to one or multiple processes executed by the at least one of the one or more target processors to determine data sequencing for memory usage for the DAG and the associated one or more of the plurality of kernels; and generating host code to configure the at least one of the one or more target processors and execute the process for the processing task on the at least one of the one or more target processors.

In accordance with an aspect of the present disclosure the method further comprises generating of data transfer configuration code for the at least one of the one or more target processor or data movement engines for execution of data read and write operations in relation to the kernel execution for the process resolved for the processing task.

In accordance with an aspect of the present disclosure resolving the DAG further comprises determining data processing requirements of the kernel wherein intermediary data for operations utilize local processor memory rather than transferred to external memory.

In accordance with an aspect of the present disclosure resolving the DAG comprises: creating a process description linking the DAG to a target processor architecture; and resolving the process description to generate the process by connecting kernels in the graph.

In accordance with an aspect of the present disclosure a process description links the DAG to the one or more target processors and allows for provisioning of processor specific configuration that may be required prior to resolution.

In accordance with an aspect of the present disclosure the host code is part of an application that is linked into a final library or binary that will run on the processor.

In accordance with an aspect of the present disclosure the kernels have defined inputs and outputs and metadata requirements for processing of data by the kernel wherein the input and outputs of the kernel have defined bit widths and the metadata is information that uniquely identifies the kernel and characterizes kernel input and output.

In accordance with an aspect of the present disclosure a target processor architecture of the one or more target processors is a multiple instruction, multiple data (MIMD), Single instruction, multiple data (SIMD), or single instruction, single data (SISD) type processor.

In accordance with an aspect of the present disclosure the kernel defines port attributes, wherein the port attribute defining an input port attribute, and output port attribute, a vector or scalar data type port attribute.

In accordance with an aspect of the present disclosure the kernel utilizes chunk width, chunk height and stride information for processing data. In accordance with an aspect of the present disclosure the kernel defines spatial dependencies of data elements for processing memory of the kernel. In accordance with an aspect of the present disclosure the method further comprising determining a data pipeline for managing data to and from target processor local memory with processing of tile based data when performing an operation associated with a kernel.

In accordance with an aspect of the present disclosure resolving the one or more of the plurality of kernels defined in the DAG to the process comprising by performing a first graph traversal to identify all kernels in the DAG and calculate a cascade depth associated with each kernel.

In accordance with an aspect of the present disclosure the method further comprising performing a second graph traversal wherein the second graph traversal for configuring all input, intermediate, and output buffers in local memory of the one or more target processors.

In accordance with an aspect of the present disclosure a circular buffer is calculated for the local memory to allocate memory for tiles based upon resolved kernels.

In accordance with an aspect of the present disclosure resolving one or more of the plurality of kernels defined in the DAG to the process comprises performing vectorization to sub-divide input data into smaller pieces for distribution on the target processor to be processed in parallel.

In accordance with another aspect of the present disclosure there is provided a device for executing host code generated by: retrieving a plurality of kernels for execution on a processor of the device, wherein a kernel is a unit of processing defined for the processor to operate on a processing operation on the processor required to performing a processing task; retrieving a directed acyclic graph (DAG) comprising one or more of the plurality of kernels and specifying connections between the one or more of the plurality of kernels, the DAG representing the processing task to be executed by the processor; resolving the one or more of the plurality of kernels defined in the DAG to one or multiple processes executed by the processor to determine data sequencing for memory usage for the DAG and the associated one or more of the plurality of kernels; and generating host code to configure the processor and execute the process for the processing task on the processor.

In accordance with another aspect of the present disclosure there is provided a non-transitory computer readable memory containing instructions for execution by a processor, the processor configured to for mapping of a processing task to one or more target processors, the instructions comprising: retrieving a plurality of kernels for execution on at least one of the one or more target processor, wherein a kernel is a unit of processing defined for the processor to operate on a processing operation on the at least one of the one or more target processors required to performing the processing task; retrieving a directed acyclic graph (DAG) comprising one or more of the plurality of kernels and specifying connections between the one or more of the plurality of kernels, the DAG representing the processing task to be executed by the target processor; resolving the one or more of the plurality of kernels defined in the DAG to one or multiple processes executed by the at least one of the one or more target processors to determine data sequencing for memory usage for the DAG and the associated one or more of the plurality of kernels; and generating host code to configure the at least one of the one or more target processors and execute the process for the processing task on the target processor.

A system and method for configuring of heterogeneous processors using configuration framework is provided. The method enables a user to implement and execute common data processing tasks on a processor without having to deal directly with the underlying hardware. A processing pipeline is created that manages transferring data from external/host memory to processor memory, processing input data (residing in processor memory) with the processor to produce output data with the processor memory, and transferring output data from processor memory back to external/host memory. In single instruction, multiple data (SIMD) array processing architectures (each with relatively small amounts of local memory) common in vector/array processors can become complicated in view of cascaded processing tasks with spatial dependencies, padding, etc.

Figure 1:
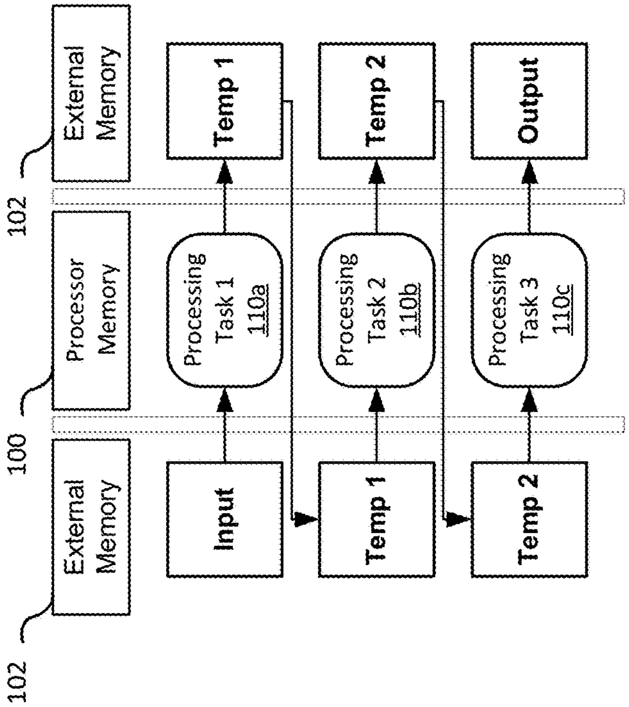
FIG. 1 shows a representation of data movement between a processor and external memory.

Much of the complexity associated with mapping a processing scenario to vector processors relates to the need for efficient data movement between external/host memory and processor memory. As shown in FIG. 1, the execution of tasks by the processor 100 requires movement of data to external memory 102 when executed each processing task 110*a*-110*c*. One of main responsibilities of the system is to minimize the cost of such data movement in the operation of the processor 100. Typically the input to a processing task is a very large amount of data, like an image or a frame of video. Minimizing the cost associated with data transfers is accomplished by pipelining data transfers with processing to 'hide' the cost of moving data to and from processor memory. By combining multiple processing tasks into a single process, the framework takes advantage of data locality and local intermediate results. In this way, the required input data is transferred from external memory 102 to processor memory once. It is then fully processed, and the results are transferred back to external memory 102 once as shown in FIG. 2. This approach significantly reduces the overhead and bandwidth associated with data movement. The configuration framework abstracts tedious and time consuming tasks associated with mapping a processing scenario to processor architecture. By allowing the processor to manage complex data transfers, pipelining, and sequencing, the user is free to focus on defining their processing scenario at a high level and be sure that it is mapped to the processing unit correctly and efficiently.

Figure 3:
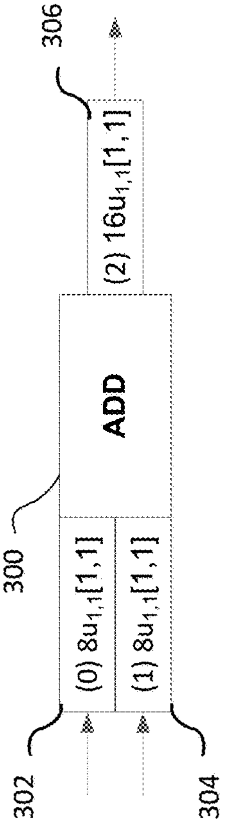
FIG. 3 depicts a simple addition (ADD) kernel.

A kernel is a well-defined unit of processing that executes on a specific processor. The kernel takes well-defined inputs, processes them, and produces well-defined outputs. FIG. 3 depicts a simple addition (ADD) kernel 300 that takes two 8-bit inputs 302 & 304 and produces one 16-bit output 306. The kernel 300 may be used to perform a function on the processor or form part of a larger processing sequence to execute a specific task. Multiple kernels may be combined to perform a desired function or task.

Figure 4:
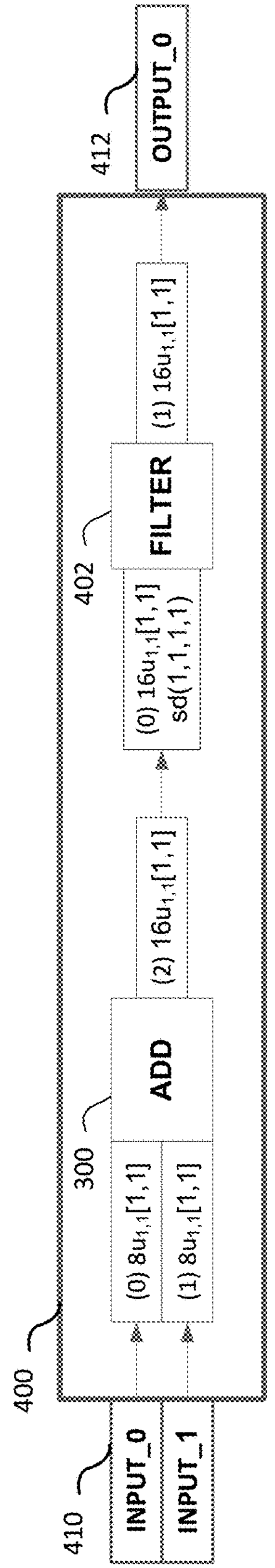
FIG. 4 depicts a directed acyclic graph (DAG)

As shown in FIG. 4 a graph 400, is a directed acyclic graph (DAG), comprised of kernels and the directed connections between them for a process to be executed. The information captured by a graph strictly relates to kernels and their interconnections. The graph can be utilized to define a processing function to be executed by a processor or an associated processing unit. In FIG. 4 the ADD kernel 300 output is connected to a filter kernel 402. Note the presence of graph-level IOs INPUT_0, INPUT_1 410 to the ADD kernel 300 and OUTPUT_0 412 of the filter kernel 402.

A process represents a graph that has been mapped to a processor architecture. This mapping is referred to as resolution (i.e. a graph was resolved to a process). In order to generate a process, a graph must be selected, a processor must be selected, and any necessary processor specific configuration information must be provided. A process is the 'ready-to-run' form of the application/algorithm represented by a graph. In a run-time setting, a process can be loaded, configured (i.e. I/O configuration), and executed.

Figure 5:
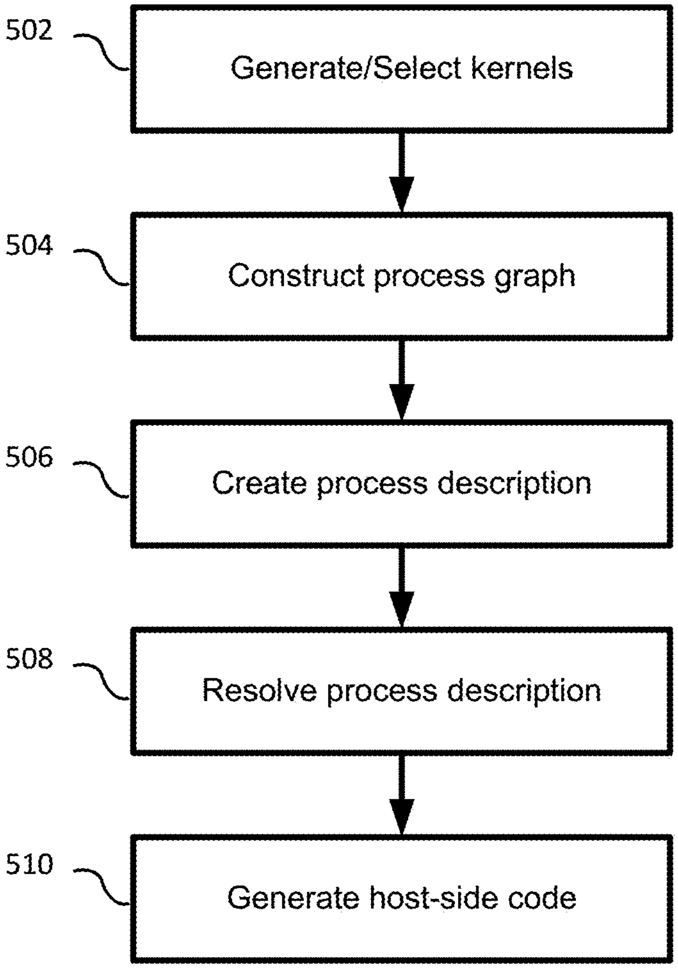
FIG. 5 shows a method of generating executable code for a processor process.

With reference to method 500 of FIG. 5, accelerating a processing task requires generating required kernel(s) or selecting from pre-existing kernel(s) and/or a kernel library (502). A graph is constructed using desired kernels by specifying connections between them (504) defining data input and output. A process description that links the graph to the processor, and provide any necessary processor specific configuration is created (506). A framework specific build process is used to resolve the process description, this produces the final processor outputs (i.e. process binary and C++ object encapsulating the process) needed for host-side execution (508). Host-side code is generated to configure and execute the processor process (i.e. configure inputs and outputs, start execution, wait for completion) (510). This code then becomes part of the host-side application and must be compiled and linked into the final library/binary that will run on the host processor.

A processor kernel is a unit of processing meant to execute on the processor. Kernels must be written in adherence to a set of rules related to kernel interface and port specification. A kernel description typically consists of three parts:
Kernel implementation: this is the kernel implementation in processor code with processor extensions.
Kernel metadata: this is information that uniquely identifies the kernel and characterizes kernel inputs and outputs (referred to as 'ports'). Kernel metadata describes generic processing characteristics of the kernel, and is not tied to any specific processor configurations.
Kernel wrapper for the processor: this is the method that wraps the kernel implementation so it can be used by the processor.

An example of a kernel implementation 600 is shown in FIG. 6 for an ADD kernel 300. For maximum flexibility, kernels should be written with variable processing loops 610 that are inputs to the kernel. In this example a processing loop 610 is set up based on the IChunkWidth and IChunkHeight input parameters. 'Chunk' simply refers to the 1D or 2D region of data to be processed by the kernel. The kernel processing is then defined within the loops 610.

It is required that the kernel implementations always make use of the chunk width, chunk height, and stride information when setting up processing loops. These are input parameters provided to the kernel by the framework and processor is free to select values for these parameters to satisfy the processing pipeline requirements. The core processing of the ADD kernel is an addition of the two inputs to produce one output 612.

FIG. 7 depicts the metadata and wrapper 700 for the ADD kernel 300. Note that this file includes a metadata section at the top 702, and the kernel wrapper method 'ADD' 704 beneath the metadata. The first field 710 in the metadata for the ADD kernel is the kernel identifier "ADD"; this identifier is used to refer to this kernel when creating a graph. This identifier should be unique as it is the only kernel 'handle' that exists and it must not clash with another kernel identifier.

The second field contains the number of ports which correspond to the number of parameters in the kernel function signature. In this example the ADD kernel has 3 ports 720, 722, 724. For each port (i.e. each input/output), a set of characteristics must be provided. Table 1 outlines the various example port characteristics which may be utilized by the framework.

TABLE 1

Kernel port characteristics

| Characteristic | Description |
| --- | --- |
| _index | The index of the associated parameter in the kernel function signature. This index links a conceptual port to a concrete function parameter. For example, the port characterized with _index(0) describes the first parameter lIn0 in the kernel function signature. Likewise, the port characterized with _index(1) describes the second parameter lIn1, etc.<br>Usage:<br>_index(<kernel parameter index starting from 0>)<br>Example:<br>_index(0) |
| _identifier | A string-based identifier that will be used to identify and refer to the port during graph creation.<br>Usage:<br>_identifier(<port identifier string>)<br>Example:<br>_identifier("INPUT_0") |
| _attributes | This characteristic is responsible for relaying details about the port type to the framework.<br>Possible values:<br>Vector input types:<br>ACF_ATTR_VEC_IN<br>ACF_ATTR_VEC_IN_FIXED<br>ACF_ATTR_VEC_IN_STATIC<br>ACF_ATTR_VEC_IN_STATIC_FIXED<br>Vector output types:<br>ACF_ATTR_VEC_OUT<br>ACF_ATTR_VEC_OUT_FIXED<br>ACF_ATTR_VEC_OUT_STATIC<br>ACF_ATTR_VEC_OUT_STATIC_FIXED<br>ACF_ATTR_VEC_OUT_FIFO<br>ACF_ATTR_VEC_OUT_FIFO_FIXED<br>Scalar input types:<br>ACF_ATTR_SCL_IN<br>ACF_ATTR_SCL_IN_FIXED<br>ACF_ATTR_SCL_IN_STATIC<br>ACF_ATTR_SCL_IN_STATIC_FIXED<br>Scalar output types:<br>ACF_ATTR_SCL_OUT<br>ACF_ATTR_SCL_OUT_FIXED<br>ACF_ATTR_SCL_OUT_STATIC<br>ACF_ATTR_SCL_OUT_STATIC_FIXED<br>Usage:<br>_attributes(<attribute>)<br>Example:<br>_attributes (ACF_ATTR_VEC_IN) |
| _spatial_dep | Specifies input spatial data dependencies (in units of e0) to the left, to the right, above, and below assuming a 2D data organization (dependencies need not be symmetrical). The framework uses pixel replication for input border padding as required.<br>Usage:<br>_spatial_dep(<left>, <right>, <top>, <bottom>)<br>Example:<br>_spatial_dep(1, 1, 1, 1) |
| _e0_data_type | Specifies the data type of element <0> ($e_0$).<br>Possible values:<br>d08u - unsigned 8-bit data<br>d08s - signed 8-bit data<br>d16u - unsigned 16-bit data<br>d16s - signed 16-bit data<br>d32u - unsigned 32-bit data<br>d32s - signed 32-bit data |

TABLE 1-continued

Kernel port characteristics

| Characteristic | Description |
| --- | --- |
| | Usage:<br>_e0_data_type(<data type>)<br>Example:<br>_e0_data_type(d08u) |
| _e0_size | Specifies the size of element<0> ($e_0$).<br>Usage:<br>_element_0(<width>, <height>)<br>Example:<br>_element_0(1, 1) |
| _ek_size | Specifies the size of element <k> ($e_k$).<br>Usage:<br>_element_k(<width>, <height>)<br>Example:<br>_element_ k(1, 1) |

Based on the port specification in FIG. 7, the example of an ADD kernel, the kernel has two 8-bit unsigned input ports and one 16-bit unsigned output port. None of the ports have spatial dependencies. The smallest unit of input data the kernel can operate on is a single 8-bit value (dictated by _e0_data_type, _e0_dim, and _ek_dim).

Port attribute definition can follow a nomenclature comprised of various keywords. Such as, but not limited to, for example:

IN/OUT—This port attribute indicates if a port is an input port (IN) or an output port (OUT).

VEC/SCL—This port attribute indicates whether data should be associated with vector or scalar memory.

- VEC—Vector data will be distributed across or read from the local memories of the processors that comprise the SIMD vector processing array. From a kernel point of view, data associated with a vector port should be interpreted as vector data (e.g. vec08u, vec16u, vec32u, etc.).
- SCL—Scalar data will be written to or read from the local memory of the Scalar Processor. From a kernel point of view, data associated with a scalar port should be interpreted as scalar data (e.g. int8_t, int16_t, int32_t, etc.).

STATIC/(non-static)—The STATIC port attribute indicates that there will only be a single instance of the memory associated with the port data, and that the framework will treat the memory associated with this port as monolithic and persistent during pipeline execution.

If the STATIC port attribute is not specified, it is assumed the memory associated with the port is NOT static. In this case the framework is free to allocate memory to meet the requirements of the processing pipeline (e.g. n-degree buffering, circular buffering, etc.).

FIXED/(non-fixed)—The FIXED port attribute indicates that the size of the data is specified exactly by _ek_dim (in units of e0) and shall not be scaled in any way by the framework. If the FIXED port attribute is not specified, it is assumed that the size of the data associated with the port is NOT fixed, and the framework is free to scale the size of the data being processed (based on the guidelines set by _ek_dim) to coincide with the optimal processing pipeline. A FIXED output port may be used when kernel output size has no meaningful dependency on kernel input size. For example, consider a kernel written to process a chunk of input data and output a single 32-bit value that contains the sum of all the values in the input chunk. In such a use case, no matter the size of the input data (8×1, 4×4, 8×8, etc.), the output is always a single 32-bit value, and should therefore be specified as FIXED.

The 'element' nomenclature exists to allow maximum flexibility when expressing the kind of data a kernel I/O can handle. The two element types can be seen as a hierarchy where $e_0$ is the base data type and $e_k$ is an array of $e_0$'s. Element<0> (or $e_0$) represents the smallest meaningful data granularity for a kernel I/O. For an 8-bit grayscale image this would be a single byte. For a packed/interleaved YUV422 image this would be a YUYV sample 'pair'.

Let $e_0$ be written as:

$e_0$=<element type><num element in x dim>, <num elements in y dim> where 'element type' can be 8u, 8s, 16u, 16s, 32u, or 32s.

Examples:

If your element is a single unsigned byte $e_0=8u_{1,1}$

If your element is an 8×1 array of signed 8-bit values $e_0=8s_{8,1}$

If your element is a 4×1 array of unsigned 16-bit values $e_0=16u_{4,1}$

If your element is a 2×2 array of unsigned 8-bit values $e_0=8u_{2,2}$ $e_0$ is used for 'type checking' when trying to connect kernels and I/Os. For example, if e0 specified by the output port of kernel A does not match $e_0$ specified by the input port of kernel B, a connection cannot be made between these two ports.

Element<k> (or $e_k$) is meant to express the smallest 2D array of e0's that make sense for a kernel IO based on the kernel implementation.

Let $e_k$ be written as:

$e_k=e_0$ [<num $e_0$ in x dim>, <num $e_0$ in y dim>]

Examples:

If the smallest unit of data a kernel can operate on is a single unsigned 8-bit value (i.e. $e_0=8u_{1,1}$) and there are no additional kernel-implementation related restrictions, $e_k$ will be '1' in both the x and y dimensions. $e_k$=[1,1] is the most common case:

$e_k=e_0$ [1,1]$=8u_{1,1}$ [1,1]

If a kernel operates on unsigned 16-bit data (i.e. $e_0=16u_{1,1}$) but the kernel implementation requires a 2×2 array of $e_0$'s:

$e_k=e_0$ [2,2]$=16u_{1,1}$ [2,2]

If the smallest unit of data a kernel can operate on is a is a 4×1 array of 8-bit signed values (i.e. $e_0=8s_{4,1}$) and the kernel implementation requires a 2×1 array of $e_0$'s:

$e_k=e_0$ [2,1]$=8s_{4,1}$ [2,1]

In addition to characterizing the smallest chunk of data that can be accepted by a kernel I/O, $e_k$ can express data rate changes that may occur between kernel input and output. Consider a kernel that decimates an input by 2 in the x and y directions. It doesn't make sense for this kernel to have an input $e_k=8u_{1,1}$ [1,1] because such an input cannot be decimated (it is just a single 8-bit value). Instead, the kernel I/O should be expressed as $8u_{1,1}$ [2,2]=>$8u_{1,1}$ [1,1]. By specifying ek=[2,2] for the input, it ensures that the kernel always receives at least a 2×2 chunk of e0's at the input port. The difference between input and output $e_k$'s make it clear that a data rate change has occurred.

Spatial dependencies can be expressed for 2D non-static vector inputs. By allowing a kernel to express spatial dependencies, it allows a more generalized kernel to be used that operates on an input chunk with flexible dimensions. Spatial dependency information is expressed as an array of 4 values as follows: sd (<$dep_{left}$>, <$dep_{right}$>, <$dep_{top}$>, <$dep_{bottom}$>) where 'sd' corresponds to the metadata port characteristic '_spatial_dep'

Figure 8:
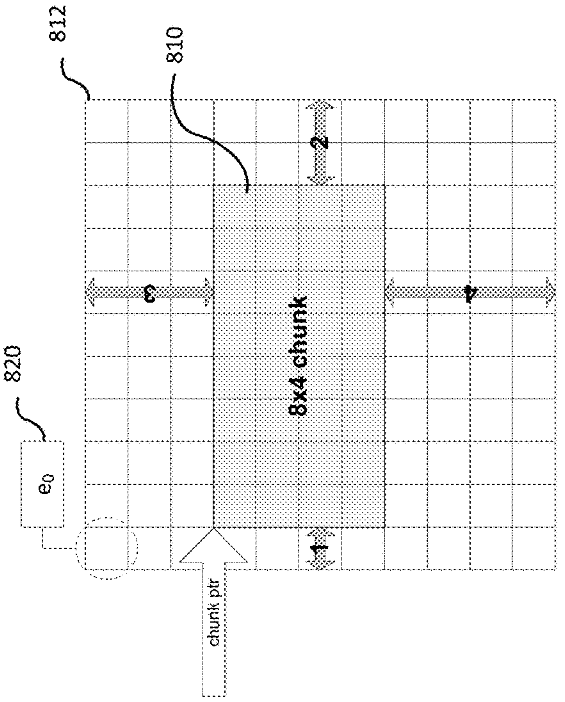
FIG. 8 shows a representation of memory spatial dependency.

With reference to FIG. 8, by specifying a spatial dependency on an input, the system is being told that it must make data beyond chunk boundaries locally available to the kernel for processing. For example, assume an 8×4 chunk 810 of data is fed into a kernel that specifies sd (1,2,3,4). In this scenario the framework will invoke the kernel on a region of memory 812. Dependencies are expressed in units of $e_0$ 820. A 3×3 filter would express spatial dependencies as sd (1,1,1,1). A 5×5 filter would express spatial dependencies as sd (2,2,2,2). Referring to FIG. 8, a Sobel 3×3 filter would be fully characterized as $8u_{1,1}[1,1]$ sd(1,1,1,1)=>$8u_{1,1}[1,1]$ The wrapper also provides a parameter list of type kernel_io_desc, where conceptually, each parameter corresponds to a kernel port. kernel_io_desc is a simple descriptor that describes the chunk of data associated with the port; it contains the address of the data in memory, in addition to a description of the data chunk (chunkWidth, chunkHeight, and chunkSpan). It is defined as follows:

```
typedef struct _kernel_io_desc
{
    void* pMem;          //pointer to the chunk of data
    int chunkWidth;      //width of the chunk in units of e0
    int chunkHeight;     //height of the chunk in units of e0
    int chunkSpan;       //number of bytes to skip to get to the next
line of bytes
} kernel_io_desc;
```

The typical first step in wrapping any kernel implementation is to 'unpack' the relevant address and chunk size information from each parameter/port kernel_io_desc structure. This structure allows access to the input and output data pointers, in addition to the necessary chunk size and span information needed for setting up processing loops. In the ADD example the unpacking is done as follows:

```
vec08u* lpvIn0 = (vec08u*)lIn0.pMem;
vec08u* lpvIn1 = (vec08u*)lIn1.pMem;
vec16u* lpvOut0 = (vec16u*)lOut0.pMem;
ADD(lpvIn0, lIn0.chunkSpan,
    lpvIn1, lIn1.chunkSpan,
    lpvOut0, lOut0.chunkSpan/2,
    lIn0.chunkWidth, lIn0.chunkHeight);
```

FIG. 9 depicts the metadata and wrapper 900 for the FILTER kernel 402. Notable metadata differences compared to the previously discussed ADD kernel include port INPUT_0 specifies a non-zero spatial dependency 910 and port INPUT_COEF specifies an ACF_ATTR_IN_STATIC_GLB_FIXED port type that allows the kernel to be configured with a 9-byte coefficient array ($e_k$=$8u_{1,1}$ [9,1]) 912. Also note the following difference in the 'unpacking' stage of the implementation 920. The ACF_ATTR_VEC_IN and ACF_ATTR_VEC_OUT ports are cast to 8-bit vector types as seen in the ADD example, whereas the ACF_ATTR_SCL_IN_STATIC_FIXED port input is cast to an 8-bit scalar type.

Figure 10:
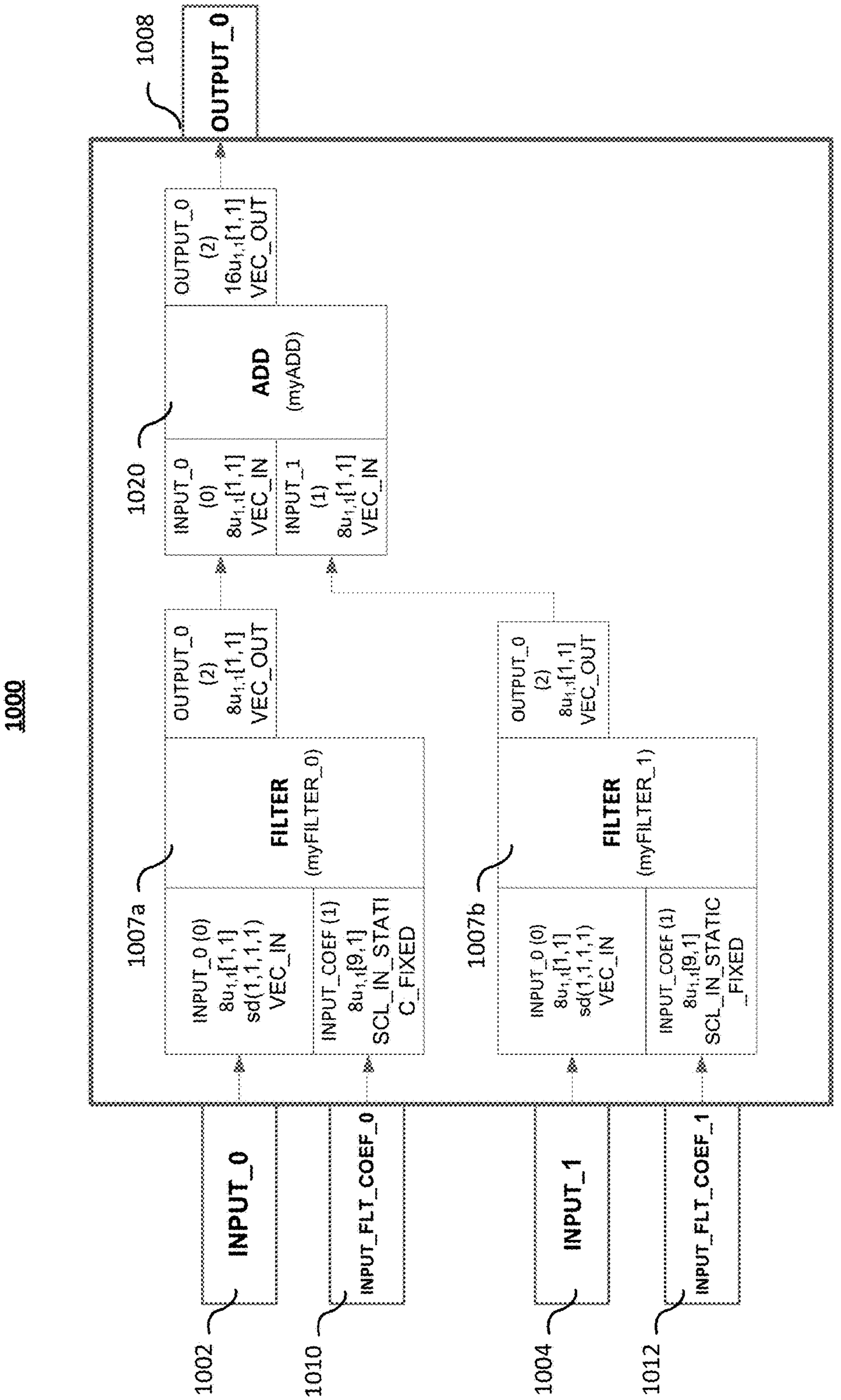
FIG. 10 shows a graph diagram for a processing task.

With reference to FIG. 10, once a set of kernels is available, graph construction is a simple matter of deciding which kernels to use and how to connect them. In this example a graph will be created that uses the ADD and FILTER kernels discussed in the previous section. Each port expresses the identifier, index, $e_k$, and spatial dependency information (if spatial dependency information is absent from a port it is assumed to zero). The port details in the diagrams above are simply restatements of the information expressed by the kernel metadata. Once each kernel is expressed, the next step is to create a graph diagram 1000 that specifies graph-level ports and all desired connections as shown in FIG. 10.

The graph diagram 1000 shows that two inputs (INPUT_0 1002 and INPUT_1 1004) are being filtered by filter 1007*a* and 1007*b* (the filters have configurable coefficients) and then added 1020 together to produce a single output (OUTPUT_0) 1008.

Note that five graph-level ports have been specified:

INPUT_0 1002

INPUT_FLT_COEF_0 1010

INPUT_1 1004

INPUT_FLT_COEF_1 1012

OUTPUT_0 1008

Graph-level ports represent the ports that will be configured in future steps (i.e. process description and host-side configuration). Once a graph diagram exists 1000, expressing the graph can then be expressed in a programmatic form.

The final ready graph code can be represented as:

```
#include <ACF_Graph.hpp>
class myGraph : public ACF_Graph
{
public:
    void Create( )
    {
        //set identifier for graph
        SetIdentifier("myGraph");
        //add kernels
        AddKernel("myADD", "ADD");
        AddKernel("myFILTER_0", "FILTER");
        AddKernel("myFILTER_1", "FILTER");
        //add graph ports
        AddInputPort("INPUT_0");
        AddInputPort("INPUT_1");
        AddInputPort("INPUT_FLT_COEF_0");
        AddInputPort("INPUT_FLT_COEF_1");
        AddOutputPort("OUTPUT_0");
        //specify connections
        Connect(GraphPort("INPUT_0"),              KernelPort("myFILTER_0",
"INPUT_0"));
        Connect(GraphPort("INPUT_FLT_COEF_0"),     KernelPort("myFILTER_0",
"INPUT_COEF"));
        Connect(GraphPort("INPUT_1"),              KernelPort("myFILTER_1",
```

-continued

```
"INPUT__0"));
        Connect(GraphPort("INPUT__FLT__COEF__1"),     KernelPort("myFILTER__1",
"INPUT__COEF"));
        Connect(KernelPort("myFILTER__0", "OUTPUT__0"),
KernelPort("myADD", "INPUT__0"));
        Connect(KernelPort("myFILTER__1", "OUTPUT__0"),
KernelPort("myADD", "INPUT__1"));
        Connect(KernelPort("myADD", "OUTPUT__0"), GraphPort("OUTPUT__0"));
    }
};
```

Note that the AddKernel( . . . ) method takes two identifiers; the first is the identifier that is used throughout the graph specification to refer to that specific instance of the kernel, and the second is the unique kernel identifier specified in the kernel metadata. The first identifier is essentially a handle on a kernel instance. For example, 'myFILTER_0' is a handle on the first instance of the 'FILTER' kernel, and 'myFILTER_1' is a handle on the second instance of the 'FILTER' kernel. If the same kernel is used multiple times in a graph, multiple instances of that kernel must be added to the graph, each with a unique local identifier.

The purpose of a process description is to link a graph to a specific processor, and allow for the provision of any processor specific configuration that may be required prior to resolution. Kernel implementations and graphs can be created to be adaptable to multiple processor architectures. This is the step where a generalized processing description (represented by a graph and its kernels) is tied to a specific processing architecture. The first step is to create a *.hpp file (e.g. myProcess_proc_desc.hpp) based on the following template:

```
#include <ACF__Process__Desc__APU.hpp>
#include "<*.hpp graph file created in step 2>"
class <process descriptor class name> : public ACF__Process__Desc__APU
{
public:
    void Create( )
    {
        Initialize(mGraph, <process identifier>);
    }
    <graph class specified in graph *.hpp file> mGraph;
};
```

Filling in the template to map the graph 1000 to the processor results in the following:

```
#include <ACF__Process__Desc__APU.hpp>
#include "myGraph__graph.hpp"
class myProcess__apu__process__desc : public ACF__Process__Desc__APU
{
public:
    void Create( )
    {
        Initialize(mGraph, "myProcess");
    }
myGraph mGraph;
};
```

Figure 11:
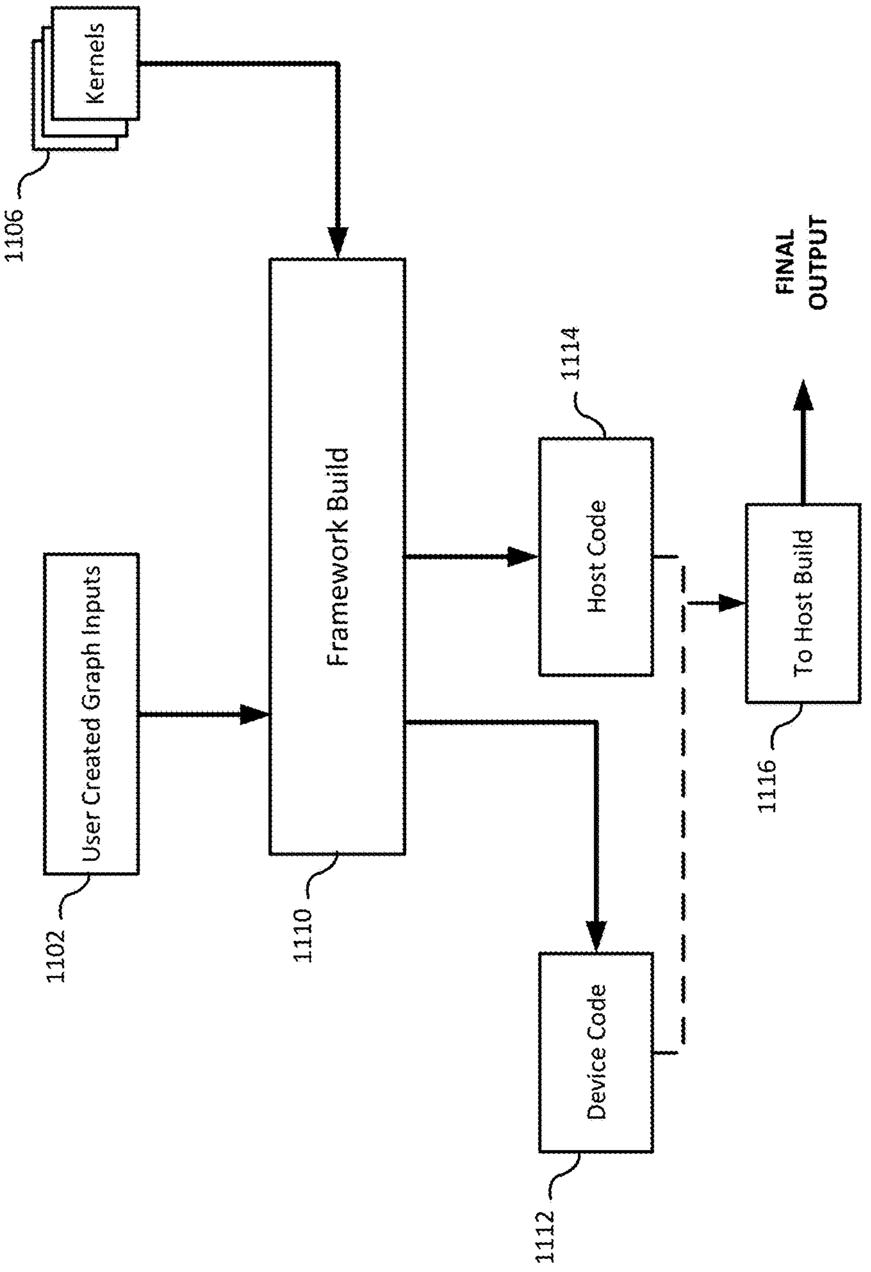
FIG. 11 show a representation of an automated framework build process.

FIG. 11 depicts an automated framework build I/O process. Automated framework build refers to the scripted process that takes the user-created inputs and generates host code. The kernel(s) 1106 are provided to, or retrieved by the automated framework build process 1110. The graph 1102 is utilized to generate build product for execution of the desired function on a target processor. The automated framework build process 1110 produces host-compatible 'handle' 1114 that encapsulates the resolved process and allows it to be instantiated, configured, and executed by a host-processor and a run-time binary/library that encapsulates the architecture specific machine code 1112 representing the generated processing pipeline. The host code and data transfer configuration code can be loaded as part of the host processor build 1116 to execute the desired functions.

The scripted automated framework build process invokes a number of common steps during the build phase (e.g. compiling kernel code, parsing kernel metadata, etc.), but the most notable step is the invocation of the resolver. The resolver translates the high-level, generalized input information (graph+kernel metadata+process description) into an efficient architecture-specific processing pipeline. Processing pipeline generation is geared towards a processing model that interleaves tile-based data transfers (to and from target processor local memory) with tile-based data processing).

The tile-based pipelining approach has several advantages and the methodology is applicable to a wide variety of target processor architectures. The methodology is capable of scaling to accommodate a wide range of input/output data sizes on a range of target processors with varying amounts of local memory. For example, by selecting smaller tile sizes, a pipeline can be scaled to run on target processors with small amounts of local memory (a common constraint in the embedded world), even if the size of data to be processed is very large. The vector processing architecture is a good example of such a scenario. By adjusting tile size (and therefore the overall target processor local memory footprint) it is possible to come up with a scheme whereby intermediate processing results can be kept in target processor local memory. This reduces the need for constant (and ultimately redundant) transfers of data into and out of target processor local memory, reducing both the bandwidth and latency associated with moving data.

It is possible to pipeline data transfers to and from target processor local memory with the processing of said data. Even if a target processor has a very large local memory that is capable of accommodating all inputs/intermediate results/outputs in their entirety, there is a cost associated with moving data between host memory and target processor local memory. A certain degree of pipelining will almost always be desirable to allow data transfers to be done in parallel with processing.

Figure 12:
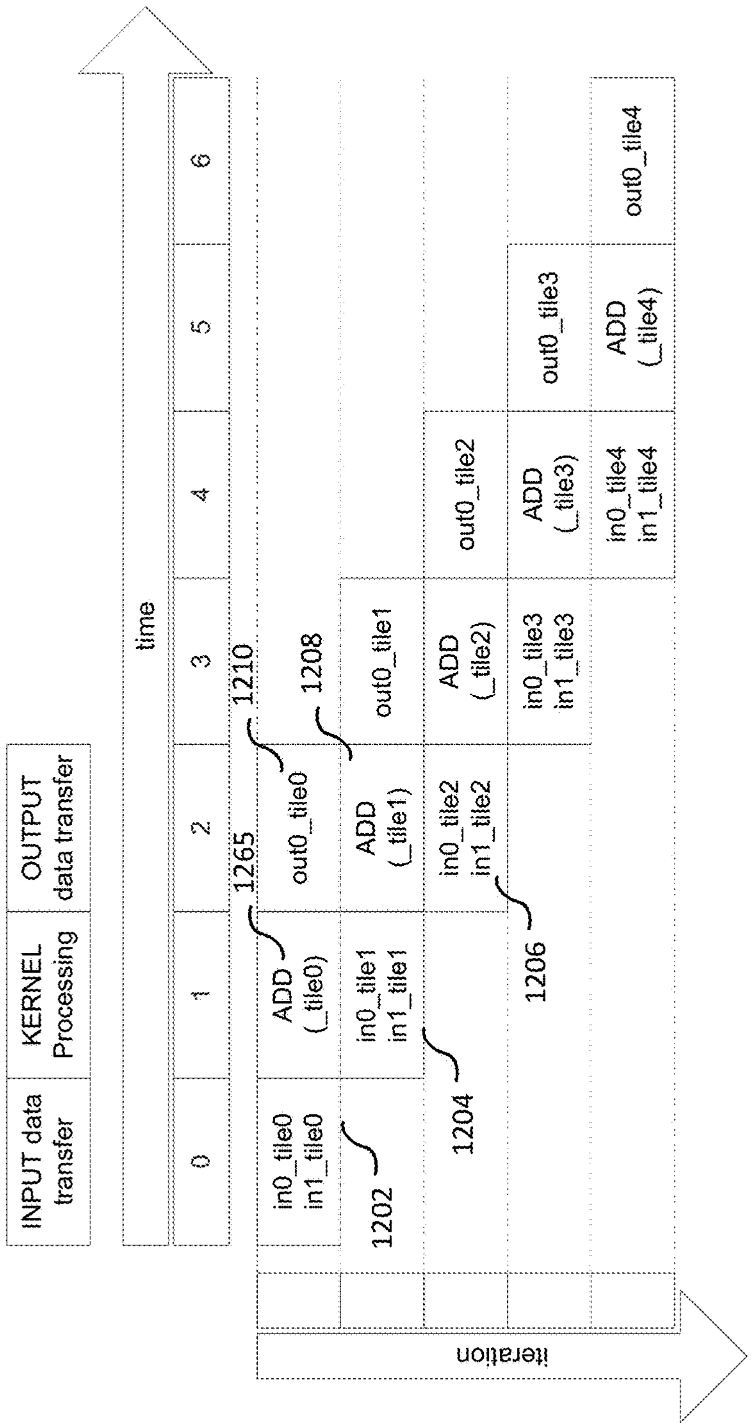
FIG. 12 shows an ADD graph pipeline example.

Consider the graph containing an ADD kernel with no spatial dependencies, assuming INPUT_0 is broken down into 5 tiles, the generated pipeline can be expressed as shown in FIG. 12. This simple pipeline 1200 demonstrates the use of double buffering to allow input/output tile transfers to/from target processor local memory to be done in parallel with processing. During time 0, in0_tile0 and in1_tile0 1202 are being transferred to local processor memory (the kernel cannot execute until the two required inputs are available). During time 1, in0_tile1 and in1_tile1 1204 are being transferred to local processor memory while at the same time tile0 1205 (transferred in during the previous time slice) is being processed. By time 2 the pipeline is full, and input (tile2) 1206, processing (tile1) 1208, and output (tile0) 1210 are all scheduled to take place simultaneously (how well they mesh/parallelize depends on the architecture and available data movement hardware).

Figure 13:
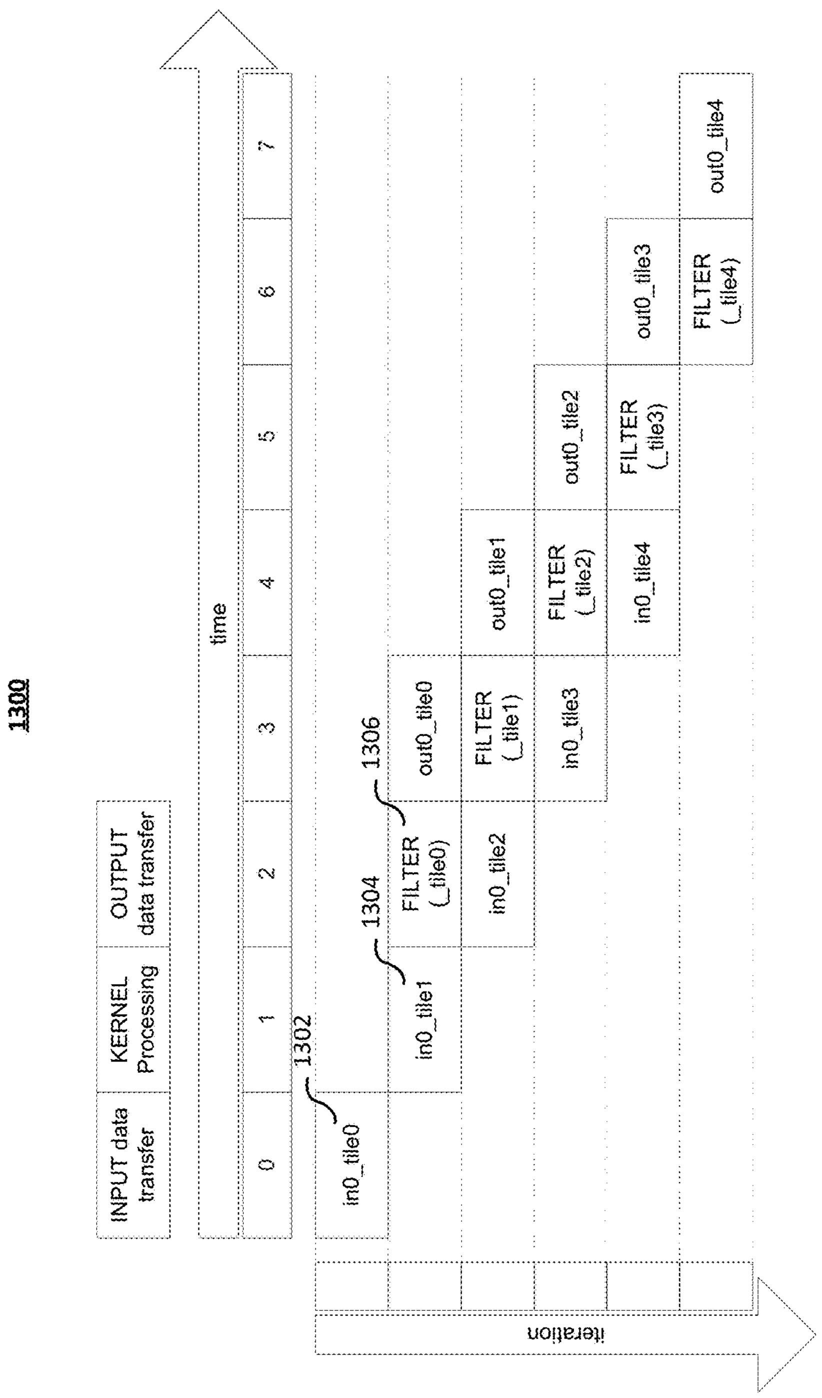
FIG. 13 shows a FILTER graph pipeline example.

With reference with FIG. 13, the processing pipeline for a FILTER kernel 1007 with spatial dependencies is described. Assuming that INPUT_0 is broken down into 5 tiles, the sequencing in this pipeline differs from the ADD graph 1020 pipeline because the filter kernel has specified non-zero spatial dependencies. The execution of the filter kernel 1306 on in0_tile0 1302 is delayed until time slot 2 because in order to fully process in0_tile0 1302, in0_tile1 1304 must also be available in local processor memory. In addition to pipeline sequencing decisions like this one, the resolver must keep track of more elaborate buffer management requirements. In this case, a larger history of buffers must be maintained for INPUT_0, and data contiguity for the correct execution of the kernel needs to be ensured.

From a high level, the resolver is tasked with calculating pipeline parameters related to input and output data transfers to and from target processor local memory. The pipeline parameters related to kernel execution on the target processor. The target processor buffer management parameters associated with input, output, and intermediate result buffering (i.e. buffer size, buffer properties, buffer multiplicity, etc.).

Figure 14:
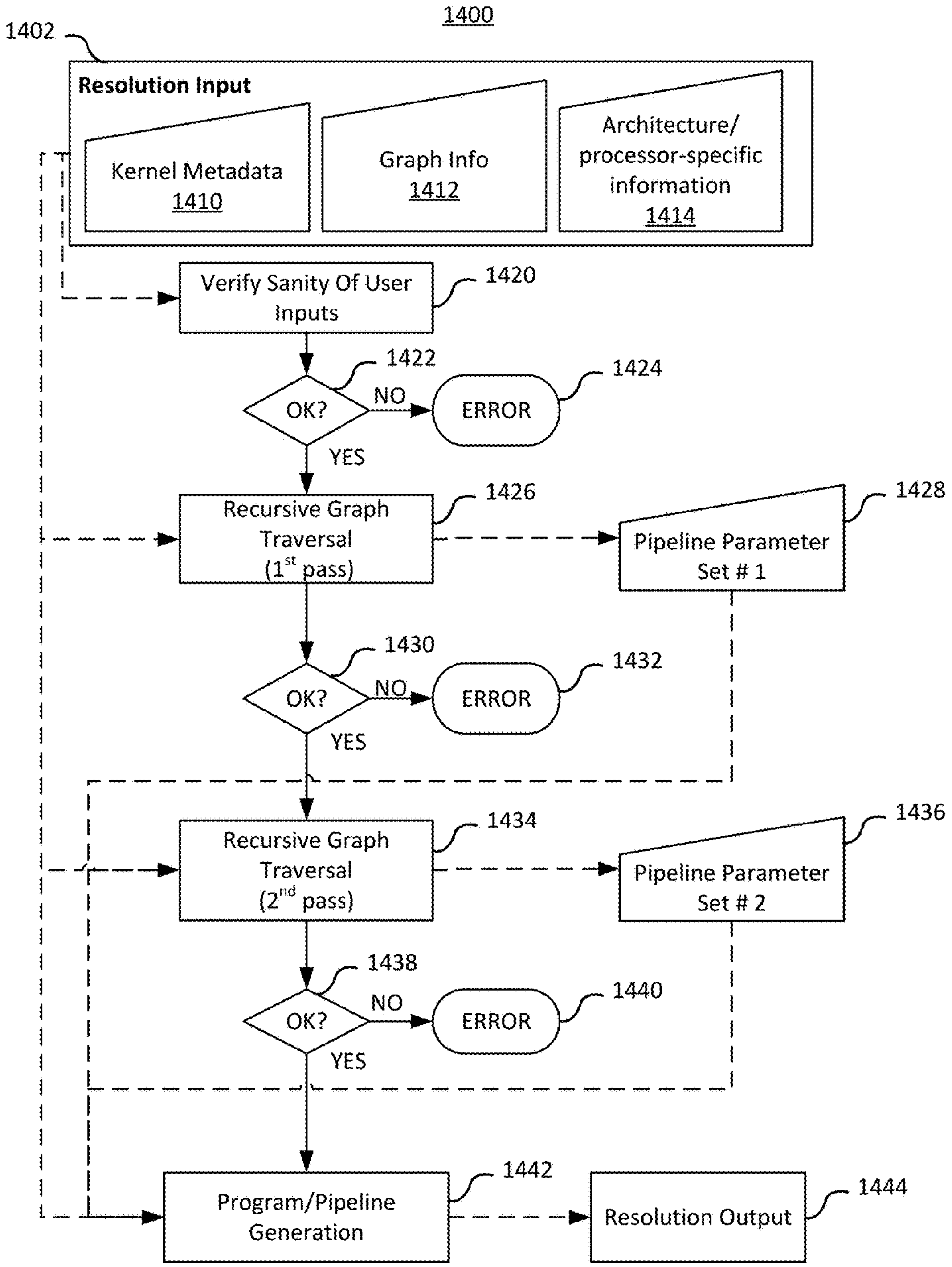
FIG. 14 shows flow diagram of a resolution process.
Figure 15:
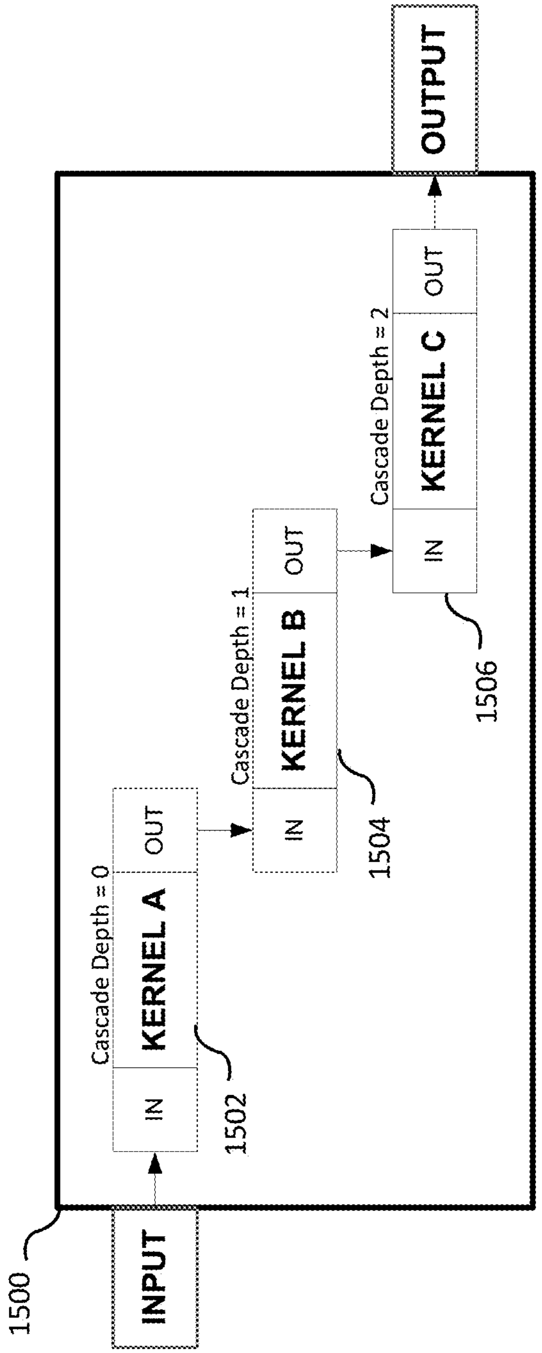
FIG. 15 shows a representation of kernel cascade depth.

FIG. 14 illustrates the steps taken by the resolver, and the inputs and outputs associated with each step in the automated framework build process. The input to the processes is resolved (1402) from kernel metadata 1410 which outlines characteristics of kernel inputs/outputs including data type, allowable chunk sizes, and 2D spatial dependencies; graph information 1412 which provides high level specification of inputs, outputs, and connections between kernels; and architecture and processor-specific information 1414 including input chunk size information. The sanity of the user inputs are verified (1420) against defined constraints for parameters in the kernels and graph. If the inputs are not defined, or are in expected ranges (No at 1422) and error can be displayed to identify any processing issues (1424). If the inputs are valid (Yes at 1422) the graph is traversed (1426). The first recursive graph traversal pass is responsible for walking through all nodes in the directed acyclic graph (DAG) and gathering/calculating the following information/parameters:

- Identification of all kernels present in the graph, and calculation of cascade depth associated with each kernel is performed as shown in FIG. 15. The output of Kernel A 1502 is provided to the input of Kernel B 1504 defining a first cascade depth. The output of Kernel B 1504 is provided to the input of Kernel C 1506 at a second cascade depth.
- Based on kernel connections and kernel port information (as specified in the kernel metadata), $e_d$ is calculated for all kernels. If it is not possible to initialize $e_d$ for all graph kernels in a consistent fashion, an error will be flagged. Once $e_d$ is known for all kernels, all output sizes are known.
- Taking kernel spatial dependencies and input tile/chunk size information into account, any additional kernel execution delays are calculated. The consequence of this calculation is illustrated in FIG. 13; the start of the filter kernel execution is delayed until time 2 (as opposed to time 1) because multiple input tiles are required to satisfy the spatial dependency requirements of the kernel. Combining kernel cascade depth information with spatial dependency delay information gives ACF a complete picture of the sequencing required for correct graph execution.

The pipeline parameters set #1 is generated defining kernel execution order $e_d$, kernel execution offset and output sizes (1428). If the 1$^{st}$ pass graph traversal isn't successful (No at 1430) and error is generated (1432). If the 1$^{st}$ pass graph traversal is successful (Yes at 1430) the second recursive graph traversal (1434) uses the information calculated in the 1st pass (1426), and is responsible for the configuration of all input, intermediate, and output buffers in target processor local memory. The 2$^{nd}$ pass of the recursive graph traversal is performed to configure all local circular buffer memory entities. A second pipeline parameter set is generated (1436) defining target processor local memory buffer and configuration details. If the 2$^{nd}$ pass graph traversal isn't successful (No at 1438) and error is generated (1440). If the 2$^{nd}$ pass graph traversal is successful (Yes at 1438) the program/pipeline generation is performed (1442) based upon the information obtained from the two graph traversal steps. The processing pipeline is generated for the processor. An architecture specific program is then generated (1444) that expresses the final processing pipeline.

In traversing the graph the memory management required by the processor architecture needs to be resolved particularly in vector processing scenarios. Double buffering is important for applicable graph-level input and output buffers to ensure that data moving into and out of local processor memory can be pipelined with the processing of said data. Double buffering simply involves ping-ponging back and forth between two buffers from a processing and data transfer point of view. More complex buffering schemes can be generated to meet the requirements of data contiguity and pipelining of processing and data movement.

Figure 16:
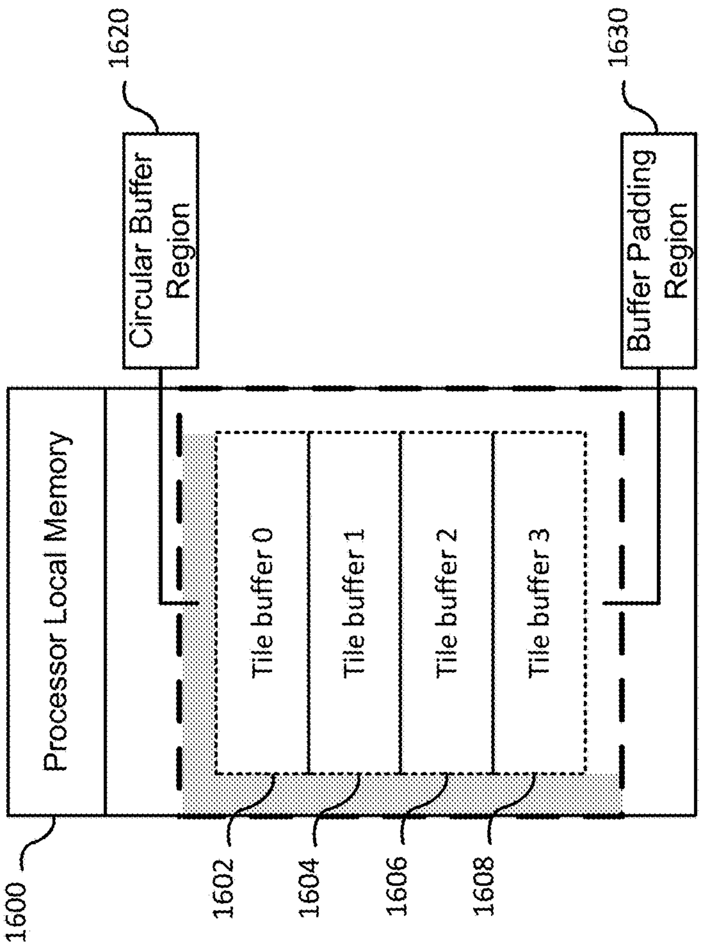
FIG. 16 shows a local memory input buffer example.

Buffering becomes more complex when spatial dependencies are involved. In addition to double/multi buffering, considerations need to be made for circular buffering (all data including 'neighboring' data must appear to be contiguous in memory from the kernels point of view). The following example shown in FIG. 16 will illustrate circular buffering in the context of the FILTER pipeline shown in FIG. 13. Consider INPUT_0 of the FILTER graph with a spatial dependency sd(1,1,1,1). The circular buffer 1620 created in target processor local memory 1600 to accommodate this input is shown in FIG. 16. This buffer contains enough memory to buffer four tiles 1602-1608 of data the four tiles 1602-1608 are required to allow double buffering and to allow spatial dependency requirements to be met (the precise reason will become clear during the analysis of FIG. 17).

Memory has also been allocated around the tiles to accommodate padding data 1630. For true input edges, padding is generated (e.g. pixel replication). For 'internal edges' (i.e. edges between adjacent chunks/tiles) data is copied to ensure that a kernel will always see a contiguous region of memory that satisfies its spatial dependency requirements.

Figure 17:
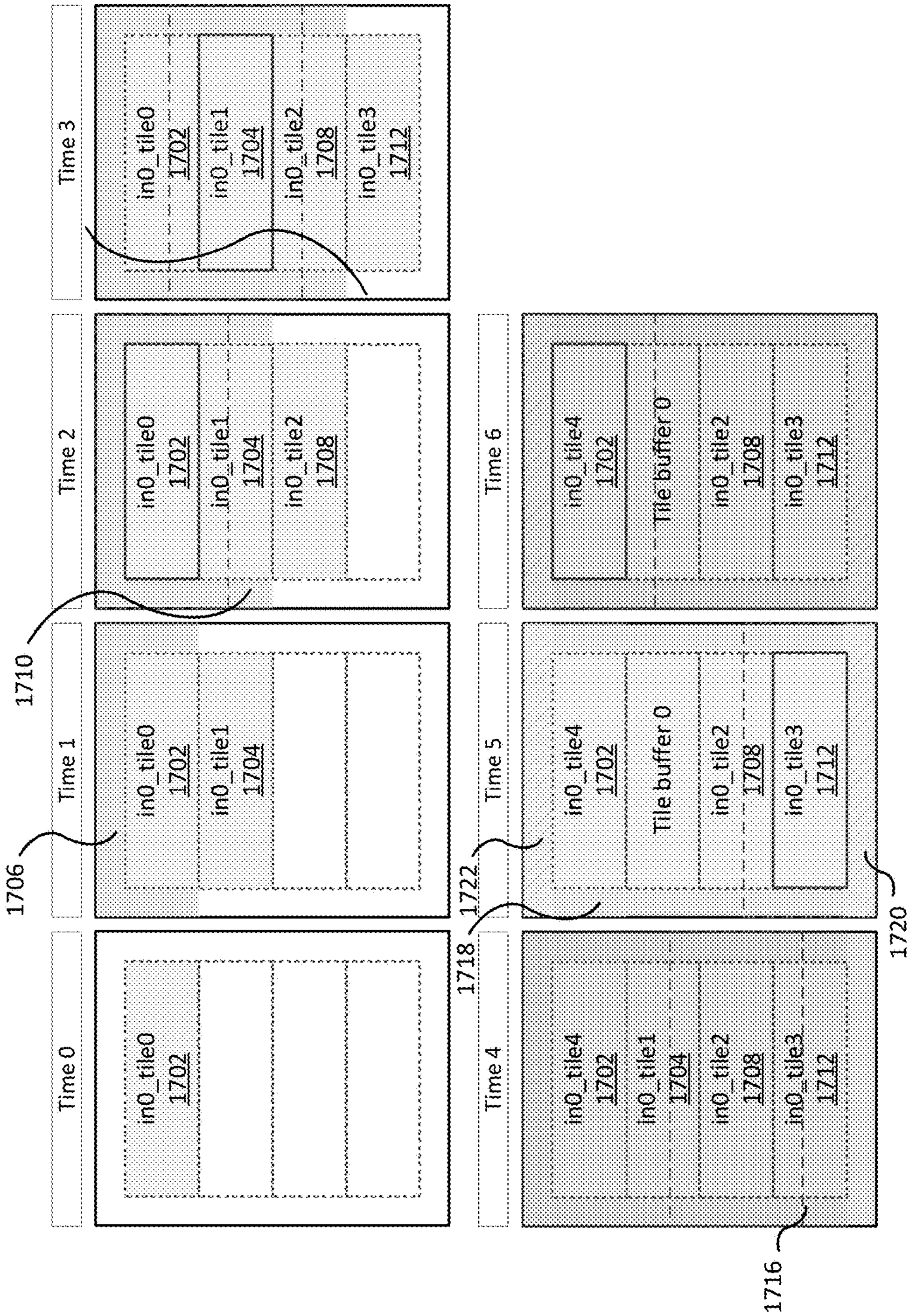
FIG. 17 shows explanation of circular buffering.

The concepts related to circular buffering and padding as they relate to spatial dependencies are explained with reference to FIG. 17. In FIG. 17 the state of the local buffer associated with INPUT_0 of the filter at points in time that correspond to times 0 through 6 in the pipeline diagram of FIG. 12. During time 0, in0_tile0 is transferred into the 1st buffer 1702. During time 1, in0_tile1 is transferred into the 2nd buffer 1704. While this input transfer is taking place, edge padding 1706 is generated for in0_tile0 (i.e. the tile transferred in the previous time slot). The 'processing' associated with padding can be seen as an implicit framework-level maintenance task that is invoked prior to kernel execution to ensure data is ready for kernel processing. During time 2, in0_tile2 is transferred into the 3rd buffer 1708. While this input transfer is taking place, padding 1710 for in0_tile1 is taken care of, and then the FILTER kernel is executed on in0_tile0, note that kernel output goes to a different buffer. During time 3, in0_tile3 is transferred into the 4th buffer 1712. While this input transfer is taking place, padding 1714 for in0_tile2 is taken care of, and then the FILTER kernel is executed on in0_tile1. It should be clear at this point why 4 tile buffers were required; the first three buffers are being used for kernel processing, while the 4th buffer is (concurrently) receiving a new tile of data. During time 4, in0_tile4 is transferred into the 1st buffer 1702 (this is the last tile). Note that buffering has wrapped around, and in0_tile4 takes the place of the no longer needed in0_tile0. While this input transfer is taking place, padding 1716 for in0_tile3 is taken care of, and then the FILTER kernel is executed on in0_tile2. During time 5, padding 1718 for in0_tile4 is taken care of. Note that because of the buffering wrap around, some additional circular buffering maintenance is performed (i.e. the top part 1720 of in0_tile4 is copied down below in0_tile3, and the bottom part 1722 of in0_tile3 is copied up above in0_tile4). Finally, the FILTER kernel is executed on in0_tile3. During time 6, the only thing left to do is execute the FILTER kernel on in0_tile4.

Figure 18:
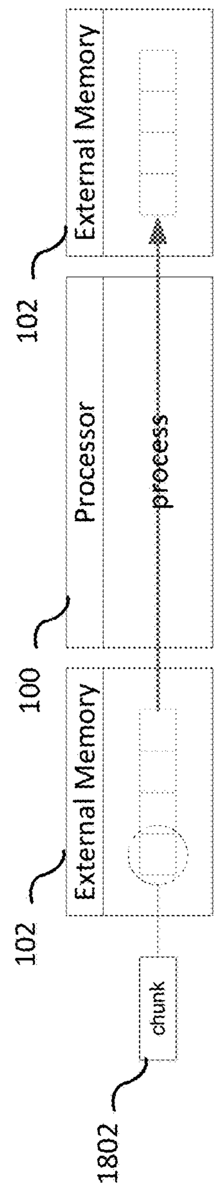
FIG. 18 shows a representation of chunk processing.
Figure 19:
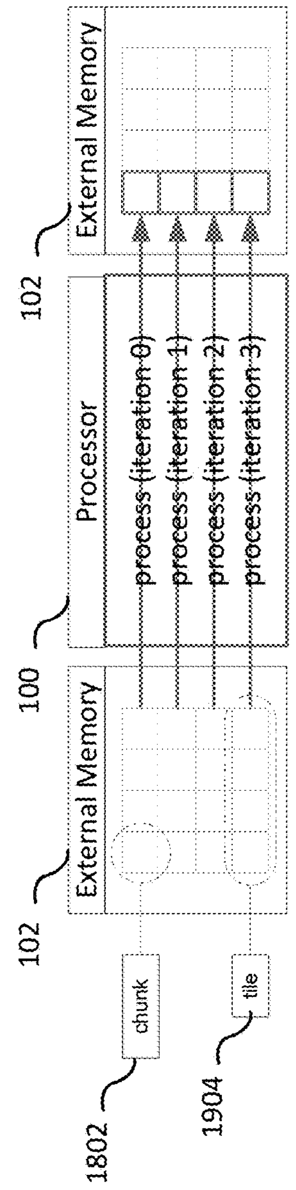
FIG. 19 shows a representation of tile processing.

With reference to FIG. 18, vectorization refers to the subdivision of input data into smaller pieces (i.e. chunks 1802) for the purpose of distribution across multiple processors 100 to be processed in parallel (i.e. data level parallelism) and minimizing use of external memory in processing operations. With reference to FIG. 19, tiling refers to the subdivision of input data into 'tiles' 1904 for sequential or iterative processing (a tile 1904 is a grouping of one or more chunks 1802 in a row). The need for tiling is in part a consequence of limited local processor memory. For example, the processor has relatively small amounts of local memory. In typical use cases, input data sizes are much too large to fit entirely into computational memory (e.g. a megapixel image), so input data must be subdivided into tiles and moved into processor memory, processed, and moved out of processor memory in a producer/consumer fashion. Tiling also improves parallelism and data locality. By breaking the processing into tiles 1904 and moving the input/output data to/from processor memory 102, framework minimizes the costs associated with memory access latencies and data transfers by pipelining tile transfers with processing.

In the kernel definition the ports need to be identified by attributes which are required for the framework to determine how data can be processed. By flagging an input port as a vector input, the framework is being told that the input data is a candidate for vectorization. This means that the framework is permitted to break associated input data into smaller pieces (chunks) and distribute the input data chunks across multiple processors for parallel processing. In the array processor unit case specifically, input data flagged as VEC is subdivided into chunks and distributed across the SIMD processing array. By flagging an input port as a scalar input, the framework is being told that input data is not a candidate for vectorization (i.e. the data cannot be split into smaller pieces and distributed across multiple processors). In the array processing unit case specifically, input data flagged as scalar input is written to processor data memory. Note that scalar data may still be subject to tiling. By flagging an input port as non-static, the framework is being told that input data is a candidate for tiling.

Input data transfers from external memory to local processor memory occur tile by tile in an iterative fashion as determined by the total input size and the user-selected chunk size. Note that the number of iterations (i.e. the number of tiles) must be consistent across ALL non-static inputs. Output data transfers from local processor memory to external memory are handled in the same iterative fashion as input transfers. By flagging an input port as static, the framework is being told that input data should not be tiled and that a single local static array processing unit buffer will be associated with this data (i.e. no circular buffering, dual or n-degree, will take place).

Static input data transfers from external memory to local array processing unit memory occur only once prior to the commencement of any processing. Such inputs are treated as monolithic data transfers. A kernel that has a static input can assume that the entirety of the static input data is available for reading at all times.

Static output data transfers from local memory to external memory occur only once following the completion of all processing unit processing, and are treated as monolithic data transfers. The non-static vector attribute is used to indicate data that is both tileable and vectorizable. It should be used for 'large' inputs (e.g. image data) that can benefit from vectorization and parallel processing and it gives the framework maximum flexibility to take advantage of processing resources.

Figure 20:
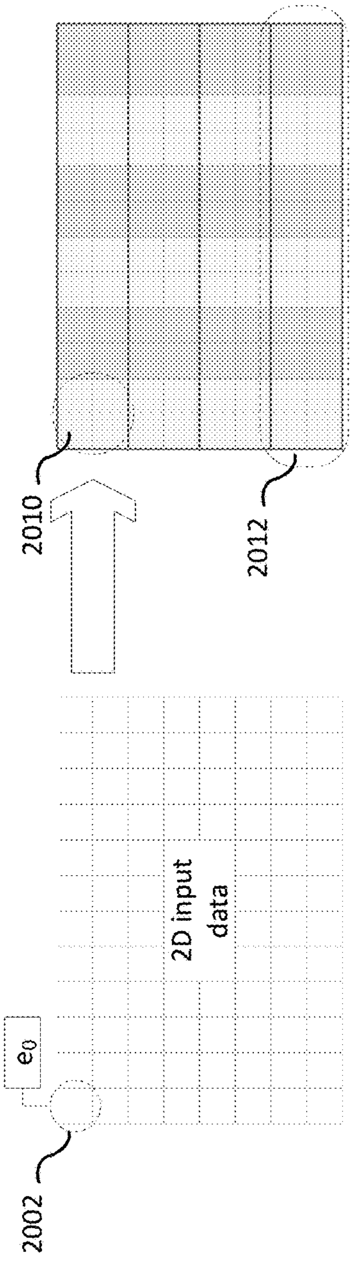
FIG. 20 shows tiling of 2D data
Figure 21:
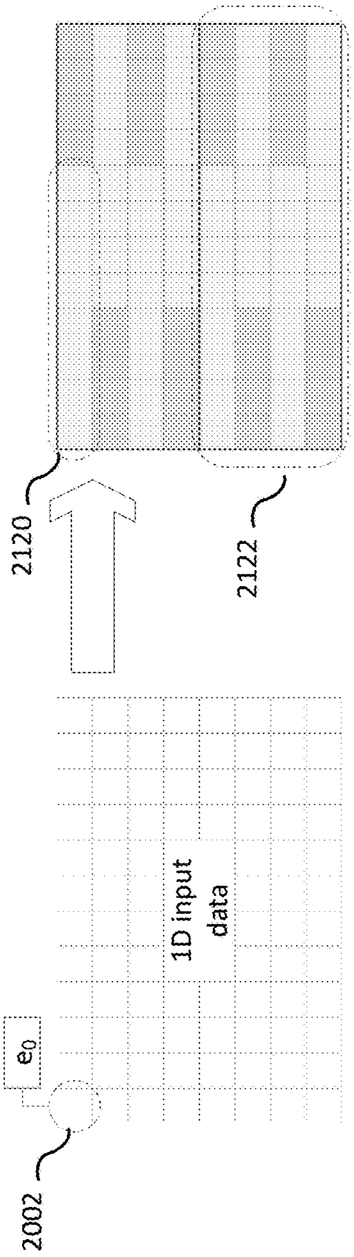
FIG. 21 shows tiling of 1D data.

Referring to FIG. 20, input data regions (and associated chunk sizes) can be 2D or 1D. In both cases the data will be subdivided into chunks 2010 and tiles 2012 in a 2D or 1D raster fashion (i.e. top to bottom, left to right). With reference to FIG. 20, the 2D input region 2002 is subdivided into 4 tiles spanning the width of the input region, each tile 2012 consisting of 6 2×2 chunks 2010. FIG. 21 In this example the 1D input region 2004 is subdivided into 2 tiles, each tile 2022 consisting of 6 8×1 chunks 2020.

The static scalar attribute can be used to indicate data that is neither tileable nor vectorizable. This type of port is useful when dealing with smaller amounts of input configuration/initialization data (e.g. filter coefficients) or input/output ports that are associated with reduction operations.

Figure 22:
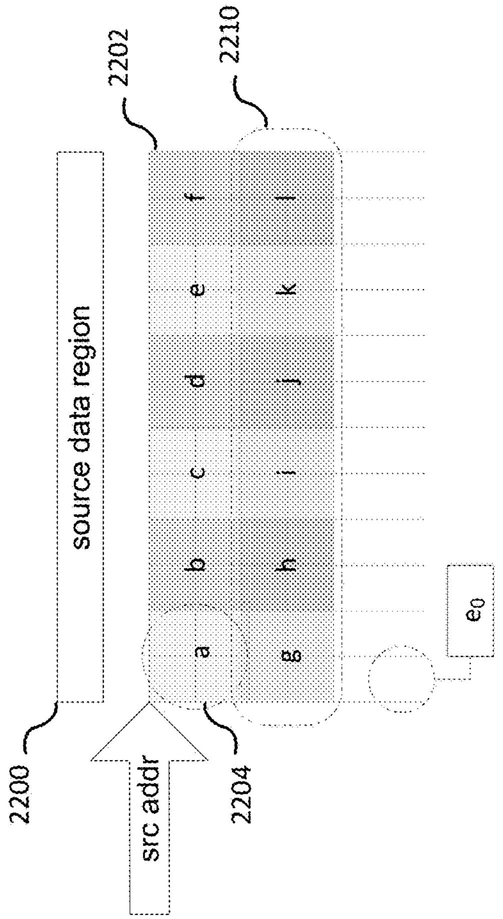
FIG. 22 shows a representation of chunk data pattern contiguous in memory.

Indirect inputs can be employed for those use cases where chunks of input of data residing in external memory do not adhere to a simple 1D or 2D raster pattern. FIG. 22 illustrates a simple1D/2D raster data pattern 2202 where the chunks of data 2204 (a, b, c . . . j, k, l) are contiguous in memory 2200. Each time 2210 consisting of 6 2×2 chunks 2204.

Figure 23:
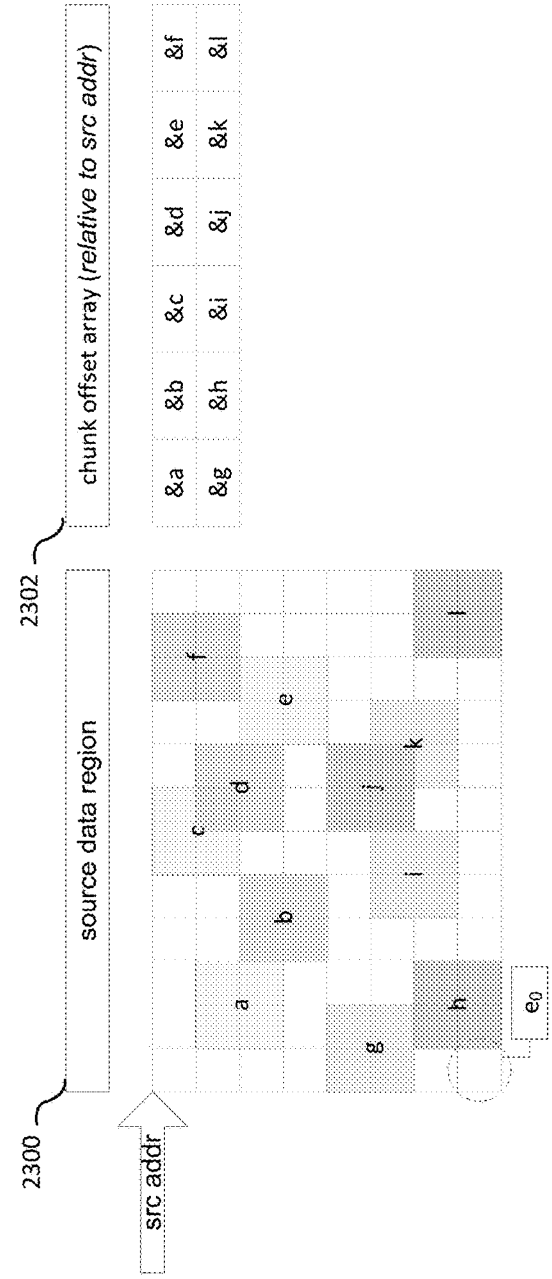
FIG. 23 shows a representation of chunk data pattern scattered in memory.

In contrast to FIG. 22, indirect input functionality allows the framework to construct tiles from chunks of data (a, b, c, . . . j, k, l) that are scattered throughout a source memory region 2300 as shown in FIG. 23. In addition to providing the source data, the user must also specify a chunk offset array 2302. This 1D or 2D offset array contains a list of byte offsets (relative to the source data region starting point).

Figure 24:
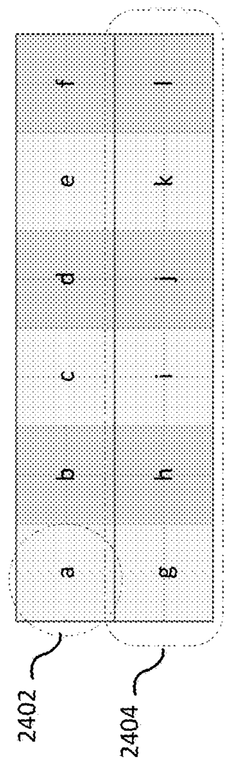
FIG. 24 show an effective view of scattered data pattern with indirect input functionality.

Consider the following example scenario where a user wishes to process 2 tiles, each consisting of 6 non-contiguous 2×2 chunks scattered throughout a source data region as shown in FIG. 23. Once the above information (i.e. the source data region and the chunk offset array) is provided to framework, the 'effective' input from framework's point of view would be as shown in FIG. 24 where the chunks 2402 are accessed in a ordered tiled format 2404.

Figure 25:
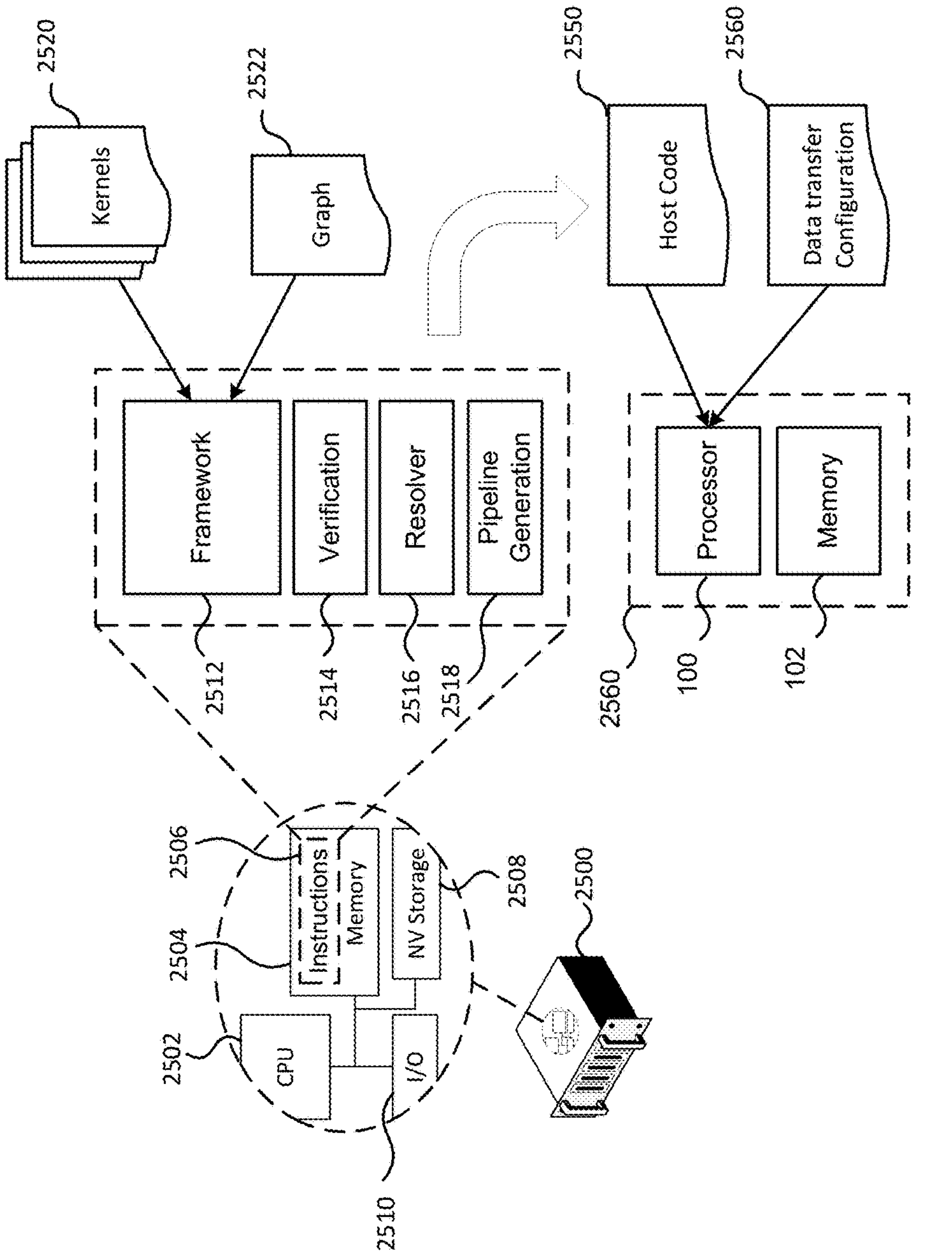
FIG. 25 shows a system for configuring multicore processing architecture for data processing.

FIG. 25 depicts components of a computing device for generating build system product to execute processing tasks on a target processor. The computing system 2500 comprises a processing unit 2502 that can execute instructions to configure the computing system to provide various functionality. The computing system 2500 further comprises a memory unit 2504 for storing instructions 2506. The computing system 2500 may further comprises non-volatile storage 2508 for storing instructions and or data as well as an input/output (I/O) interface 2510 for connecting one or more additional peripherals to the computing system 2500. The functions required by the framework may be distributed between one or more devices to generate host code and data transfer configuration code for the target processor or associated direct memory access or data movement engines.

The instructions, when executed by the processing unit 2502, provide a configuration framework for providing an abstraction layer for processor 100 to abstract data movements within the processor 100 and external memory 102 providing in a computing device 2560. The framework utilizes kernels 2520 which are utilized to define graphs 2522 defining processing tasks to be executed on the processor 100 architecture. The framework 2512 utilizes or provides verification functionality 2514 to verify kernel interaction and connections defined in the graph 2522. The resolver functionality 2516, traverses the graph in multiple passes to determine execution order, kernel input/outputs, kernel execution offsets and output sizes which can then be utilized the resolver to configure local circular buffer memory entities to external memory usage. Pipeline generation functionality 2518 generates the processing pipeline for the processing architecture and generating host code 2550 to configure and execute the processing task on the target processor and data transfer configuration code 2560 for the target processor to execute data read and write operations in relation to the kernel execution.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-25 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of mapping of a processing task to one or more target processors, the method comprising:

retrieving a plurality of kernels for execution on at least one of the one or more target processors, wherein a kernel is a unit of processing defined for the processor to operate on a processing operation on the at least one of the one or more target processors required to perform the processing task;

retrieving a directed acyclic graph (DAG) comprising one or more of the plurality of kernels and specifying connections between the one or more of the plurality of kernels, the DAG representing the processing task to be executed by the at least one of the one or more target processors;

resolving the one or more of the plurality of kernels defined in the DAG to one or multiple processes executed by the at least one of the one or more target processors to determine data sequencing for memory usage for the DAG and the associated one or more of the plurality of kernels, wherein resolving the one or more of the plurality of kernels defined in the DAG to the process comprises performing a first graph traversal to identify all kernels in the DAG to calculate and obtain a cascade depth value associated with each kernel; and generating host code to configure the at least one of the one or more target processors and perform the processing task on the at least one of the one or more target processors.

2. The method of claim 1 wherein the method further comprises generating of data transfer configuration code for the at least one of the one or more target processor or data movement engines for execution of data read and write operations in relation to executing the one or more of the plurality of kernels for the process resolved for the processing task.

3. The method of claim 1 wherein resolving the DAG further comprises determining data processing requirements of the one or more of the plurality of kernels wherein intermediary data for operations utilize local processor memory rather than transferred to external memory.

4. The method of claim 1 wherein resolving the DAG comprises:

creating a process description linking the DAG to a target processor architecture; and resolving the process description to generate a process by connecting the one or more of the plurality of kernels in the graph.

5. The method of claim 1 wherein a process description links the DAG to the one or more target processors and allows for provisioning of processor specific configuration that may be required prior to resolution.

6. The method of claim 1 wherein the host code is part of an application that is linked into a final library or binary that will run on the one or more target processors.

7. The method of claim 1 wherein the one or more of the plurality of kernels have defined inputs and outputs and metadata requirements for processing of data by the kernel wherein the input and outputs of the kernel have defined bit widths and the metadata is information that uniquely identifies the kernel and characterizes kernel input and output.

8. The method of claim 1 wherein a target processor architecture of the one or more target processors is a multiple instruction, multiple data (MIMD), Single instruction, multiple data (SIMD), or single instruction, single data (SISD) type processor.

9. The method of claim 1 wherein the one or more of the plurality of kernels define port attributes, wherein the port attribute defining an input port attribute, and output port attribute, a vector or scalar data type port attribute.

10. The method of claim 9 wherein the one or more of the plurality of kernels utilize chunk width, chunk height and stride information for processing data.

11. The method of claim 10 wherein the one or more of the plurality of kernels define spatial dependencies of data elements for processing memory of the one or more of the plurality of kernels.

12. The method of claim 11 further comprising determining a data pipeline for managing data to and from target processor local memory with processing of tile based data when performing an operation associated with the one or more of the plurality of kernels.

13. The method of claim 1 further comprising performing a second graph traversal wherein the second graph traversal for configuring all input, intermediate, and output buffers in local memory of the one or more target processors.

14. The method of claim 13 wherein a circular buffer is calculated for the local memory to allocate memory for tiles based upon resolved kernels.

15. The method of claim 1 wherein resolving the one or more of the plurality of kernels defined in the DAG to the process comprises performing vectorization to sub-divide input data into smaller pieces for distribution on the one or more target processors to be processed in parallel.

16. A device for executing host code generated by:

retrieving a plurality of kernels for execution on a processor of the device, wherein a kernel is a unit of processing defined for the processor to operate on a processing operation on the processor required to performing a processing task;

retrieving a directed acyclic graph (DAG) comprising one or more of the plurality of kernels and specifying connections between the one or more of the plurality of kernels, the DAG representing the processing task to be executed by the processor;

resolving the one or more of the plurality of kernels defined in the DAG to one or multiple processes executed by the processor to determine data sequencing for memory usage for the DAG and the associated one or more of the plurality of kernels, wherein resolving the one or more of the plurality of kernels defined in the DAG to the process comprises performing a first graph traversal to identify all kernels in the DAG to calculate and obtain a cascade depth value associated with each kernel; and generating host code to configure the processor and execute the process for the processing task on the processor.

17. The processor of claim 16 wherein resolving the DAG further comprises determining data processing requirements of the one or more of the plurality of kernels wherein intermediary data for operations utilize local processor memory rather than transferred to external memory.

18. The processor of claim 16 wherein a target processor architecture of the one or more target processors is a multiple instruction, multiple data (MIMD), Single instruction, multiple data (SIMD), or single instruction, single data (SISD) type processor.

19. A non-transitory computer readable memory containing instructions for execution by a processor, the processor configured to for mapping of a processing task to one or more target processors, the instructions comprising:

retrieving a plurality of kernels for execution on at least one of the one or more target processor, wherein a kernel is a unit of processing defined for the processor to operate on a processing operation on the at least one of the one or more target processors required to performing the processing task;

retrieving a directed acyclic graph (DAG) comprising one or more of the plurality of kernels and specifying connections between the one or more of the plurality of kernels, the DAG representing the processing task to be executed by the target processor;

resolving the one or more of the plurality of kernels defined in the DAG to one or multiple processes executed by the at least one of the one or more target processors to determine data sequencing for memory usage for the DAG and the associated one or more of the plurality of kernels, wherein resolving the one or more of the plurality of kernels defined in the DAG to the process comprises performing a first graph traversal to identify all kernels in the DAG to calculate and obtain a cascade depth value associated with each kernel; and generating host code to configure the at least one of the one or more target processors and execute the process for the processing task on the target processor.

* * * * *